W. WILCOX AND C. LA DUKE.
ROD PULLER.
APPLICATION FILED DEC. 17, 1920.
1,389,469.
Patented Aug. 30, 1921.
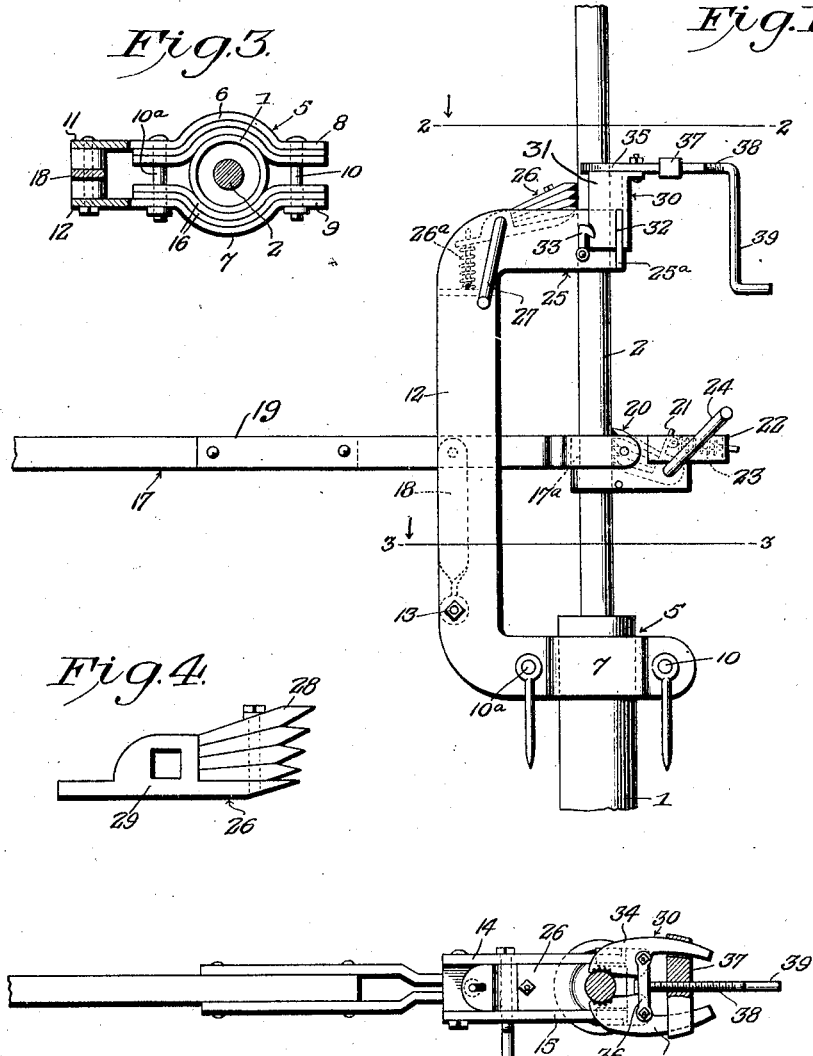
Inventor
Charlie La Duke,
Walter Wilcox,
By
Geo. P. Kimmel, Attorney

UNITED STATES PATENT OFFICE.

WALTER WILCOX AND CHARLEY LA DUKE, OF OCONTO, NEBRASKA.

ROD-PULLER.

1,389,469.	Specification of Letters Patent.	Patented Aug. 30, 1921.

Application filed December 17, 1920. Serial No. 431,446.

*To all whom it may concern:*

Be it known that we, WALTER WILCOX and CHARLEY LA DUKE, citizens of the United States, residing at Oconto, in the county of Custer and State of Nebraska, have invented certain new and useful Improvements in a Rod-Puller, of which the following is a specification.

This invention relates to rod pullers for wells.

The object of the invention is to provide simple and efficient alternately operating gripping means for removing a sucker or pump rod step by step.

Another object is to provide a one-piece frame structure carrying at one end a support engaging clamp and at its other end a rod receiving loop and equipped with removable gripping elements to alternately engage the rod to be raised.

Another object is to provide simple and efficient means for holding the coupling while the rod is being tightened.

With these and other objects in view, the invention consists in certain novel features of construction as hereinafter shown and described, and specifically pointed out in the claims.

In the accompanying drawings:

Figure 1 represents a side elevation of the device constituting this invention shown applied.

Fig. 2 is a transverse section taken on the line 2—2 of Fig. 1.

Fig. 3 is a similar view taken on the line 3—3 of Fig. 1.

Fig. 4 is an enlarged side elevation of one of the gripping dogs detached; and,

Fig. 5 is a perspective view of one of the detachable teeth of said dog.

In the embodiment illustrated a pump casing 1 is shown having a sucker rod 2 extending upwardly therefrom and in connection with which this improved puller is shown connected.

The puller constituting the invention comprises a casing engaging clamp 5 composed of outwardly and oppositely bowed clamping jaws 6 and 7 having parallel apertured terminals 8 and 9 connected by a bolt 10. Rising from the jaws 6 and 7 at a point diametrically opposite the apertured ears 8 and 9 are two side bars 11 and 12 which form an upright body member from the upper end of which extends laterally a rod encircling loop 25 between the side members of which is mounted a dog 26 having an arm 27 connected to release or disengage it at will, a spring 26ª being engaged with said dog to normally force it into engagement with the rod 2.

The clamp formed by the outwardly bowed jaws 6 and 7 is preferably provided with fillers 16 which are here shown in the form of semi-circular members having apertured extensions at opposite ends to receive the securing bolts 10 and 10ª and are adapted to be inserted or removed to adapt the clamp to fit stands or casings of different sizes, tightening handles or wrenches being carried by the bolts always ready for use.

The frame including the members above described is shown formed of a metal strap folded midway its ends and bent edgewise to form the clamp 5 and loop 25 the side members of the loop 25 being numbered 14 and 15.

An operating lever 17 is mounted between the side members of the body portion of the frame and fulcrumed intermediate its ends to an upright bar 18 mounted between the members of said frame and secured at its lower end to said frame by bolt 13. This mounting of lever 17 permits it to be moved vertically without danger of bending the rod 2 being pulled. The front end of this lever is bifurcated and the furcations thereof have mounted between them a gripping dog 20 pivoted on a crank handle 24. This crank handle is removable to provide for the disconnection of the dog should it become worn or broken and permit the substitution of a new dog. This dog 20 has an upstanding rear heel 21 between which and an upstanding lug 22 on lever 17 is mounted a coiled spring 23 which bears on said heel and forces the dog normally into gripping position. The inner wall or base of the furcations 19 form a shoulder 17ª designed to coöperate with the dog 20 to clampingly engage between them the rod 2 to be lifted.

The dog 26 operates in a direction opposite to the direction of the dog 20 and is designed to engage the diametrically opposite side of the rod 2 when the puller is in operative position as shown in Fig. 1 it being obvious that after rod 2 has been lifted and the dog 20 released therefrom the rod will move downward a slight distance sufficient to cause dog 26 to bitingly engage the rod and clamp it between the inner face of the end wall of loop 25 and securely hold the rod in raised position until the dog 20 carried by the lever 17 is again engaged with the rod and an upward movement exerted thereon by downwardly depressing the rear end of the lever. This upward movement of the rod 2 operates to release dog 26 and permit the rod 2 to be lifted relatively to the frame. The dogs 20 and 26 are both constructed of a plurality of knives or teeth 28 bolted to a substantially L-shaped frame 29 to provide for the renewal of the individual teeth when desired. These teeth 28 decrease in length from the outer to the inner as shown clearly in Fig. 4 and the biting ends thereof are beveled to form knife edges and curved to fit the rod 2 as shown in Fig. 5.

From the above description it will be seen that the raising and lowering of lever 17 will alternately release and engage the dog 20 so that the rod 2 will be lifted step by step until it has been removed from the casing 1 or elevated to the desired point.

Pivoting the dogs 20 and 26 on their respective crank arms provides for the removal of the dogs to permit new ones to be substituted and which also provides for the actuation of these dogs by manipulation of their handles to release or engage them with the rod 2 independently of the actuation of lever 17.

A coupling holder 20 is detachably mounted on loop 25 and includes a supporting bracket, the side members as 31 of which straddle the end of said loop and slotted at their lower edges to form seats as 32 to engage outturned flanges 25ª carried by loop 25. A latch 33 carried by said loop engages a notch in said bracket and detachably secures the holder on the loop. Opposed jaws 34 and 35 are pivoted on the upper end of said bracket and connected by a link 36, the rear ends of said jaws extending loosely through a bar or block 37 with which between said ends, a rod 38 has threaded engagement. This rod 38 has swiveled connection with link 36 and when said rod is rotated the jaws will be opened or closed according to the direction in which it is turned, this opening and closing movement being effected by the sliding of block 37 on the rear jaw ends, said ends converging as shown in Fig. 2 for this purpose.

The preferred embodiment of the invention is disclosed in the drawings and set forth in the specification, but it will be understood that any modifications within the scope of the claimed invention may be made in the construction without departing from the principle of the invention or sacrificing any of its advantages.

What we claim is:

1. A device of the class described comprising a frame having a support engaging clamp at one end and carrying a rod receiving loop with a dog mounted to coöperate therewith to clamp between them a rod to be lifted, and lever carried rod gripping means to coöperate with said frame carried means, the two sets of gripping means operating on opposite sides of the rod to be gripped, said means operating alternately to grip and release the rod to be lifted.

2. A device of the class described comprising a frame including an upright member having a laterally extended support engaging clamp at one end and a laterally extended rod encircling loop at its other end, a spring pressed dog mounted to coöperate with said loops to grip a rod between them, a lever fulcrumed intermediate its ends on said upright between the clamp and loop, said lever carrying a spring pressed dog and a coöperating shoulder to grippingly engage between them the rod to be lifted, said rod gripping means operating on opposite sides of the rods to be gripped.

3. A device of the class described comprising a frame including an upright member having a laterally extended support engaging clamp at one end and a laterally extended rod encircling loop at its other end, a spring pressed dog mounted to coöperate with said loop to grip a rod between them, a lever fulcrumed intermediate its ends on said upright between the clamp and loop, said lever carrying a spring pressed dog and a coöperating shoulder to grippingly engage between them the rod to be lifted, said dogs being mounted to operate on opposite sides of the rod to be gripped and having operating crank handles to engage or disengage them from the rod to be lifted.

4. A device of the class described comprising a one-piece frame composed of a metal strap folded midway its ends to form a loop, the side members thereof being laterally spaced and bent edgewise to form a body member extending substantially at right angles to said loop with its terminals extended at right angles thereto in the same direction as the loop and bowed outwardly in opposite directions and then extended parallel to form a support engaging clamp, said parallel ends being apertured to receive a connecting bolt, a lever fulcrumed intermediate its ends between the side members of said frame, and gripping jaws carried by said loop and lever to alternately grip a rod to be lifted.

5. A device of the class described comprising a frame including an upright composed of laterally spaced bars having right angular end extensions, one of said extensions having rod gripping means and the other a support engaging clamp, a bar pivoted at one end between the spaced bars of the frame upright, a lever extending between said spaced bars and fulcrumed midway its ends on the free end of said pivoted bar, and rod gripping means carried by said lever for coöperation with the frame carried gripping means.

6. A device of the class described including a gripping dog composed of a frame having a plurality of superposed biting teeth detachably mounted therein, said teeth decreasing in length from the outermost to the innermost.

7. A device of the class described comprising a frame having a support engaging clamp at one end and carrying a rod receiving loop with a dog mounted to coöperate therewith to clamp between them a rod to be lifted, and lever carried rod gripping means to coöperate with said frame carried means, the two sets of gripping means operating on opposite sides of the rod to be gripped, said means operating alternately to grip and release the rod to be lifted, and means for holding the device on the rod while the pipe is being tightened.

8. In a device of the class described comprising a frame having a support engaging clamp at one end and carrying a rod receiving loop with a dog mounted to coöperate therewith to clamp between them a rod to be lifted, and lever carried rod gripping means to coöperate with said frame carried means, the two sets of gripping means operating on opposite sides of the rod to be gripped, said means operating alternately to grip and release the rod to be lifted, and means for holding the device on the rod while the pipe is being tightened, said means comprising gripping jaws equipped with means for opening and closing them.

In testimony whereof we affix our signatures hereto.

WALTER WILCOX.
CHARLEY LA DUKE.